United States Patent [19]
Tilley

[11] Patent Number: 6,079,781
[45] Date of Patent: Jun. 27, 2000

[54] VENTILATED CHILD RESTRAINT SEAT

[76] Inventor: Jay M. Tilley, 3568 Buford Hwy., Duluth, Ga. 30096

[21] Appl. No.: 09/170,230

[22] Filed: Oct. 13, 1998

[51] Int. Cl.[7] ............................... A47C 1/11; A47C 7/74; B60N 2/26

[52] U.S. Cl. ...................................... 297/250.1; 297/180.1; 297/180.13; 297/180.14; 297/180.11; 297/256.15; 297/217.1; 297/487; 297/488

[58] Field of Search ............................ 297/250.1, 256.15, 297/180.1, 180.13, 180.14, 487, 488, 217.1, 180.11

[56] References Cited

U.S. PATENT DOCUMENTS

| | | | |
|---|---|---|---|
| 2,931,286 | 4/1960 | Fry, Sr. et al. | 297/180.13 X |
| 3,137,523 | 6/1964 | Karner | 297/180.13 |
| 4,946,220 | 8/1990 | Wyon et al. | 297/180.13 |
| 4,997,230 | 3/1991 | Spitalnick | 297/180.13 X |
| 5,002,336 | 3/1991 | Feher | 297/180.13 |
| 5,004,294 | 4/1991 | Lin | 297/180.13 X |
| 5,370,439 | 12/1994 | Lowe et al. | 297/180.13 X |
| 5,385,382 | 1/1995 | Single, II et al. | 297/180.13 |
| 5,482,352 | 1/1996 | Leal et al. | 297/217.4 |
| 5,613,729 | 3/1997 | Summer, Jr. | 297/180.13 X |
| 5,624,156 | 4/1997 | Leal et al. | 297/250.1 X |
| 5,626,386 | 5/1997 | Lush | 297/180.13 |
| 5,715,695 | 2/1998 | Lord | 297/180.1 X |
| 5,902,014 | 5/1999 | Dinkel et al. | 297/180.13 X |

*Primary Examiner*—Jose V. Chen
*Assistant Examiner*—Rodney B. White

[57] ABSTRACT

A ventilated child restraint seat (10) for use in, for example, an automobile, includes a molded plastic seat member into which is formed a seat bottom (14), a seat back (16), and left and right side portions (18,20, 22, 24). The molded seat member is also sized and shaped so as to fit in a conformed fashion with conventional automobile bench and bucket seats. Formed through and in the bottom, back, left and right side portions are a plurality of openings (40,42,44) or vents through which fresh air may flow. Disposed behind the bottom and back portions of the seat member, on the side thereof closest to the automobile seat, is an air reservoir (80) or opening into which fresh air slows. Air in the reservoir flows through the vents and into the seat. Air is supplied to the reservoir by the ventilation system (60) of the automobile into which the restraint seat is disposed, and connected thereto by a flexible duct or hose (62).

10 Claims, 3 Drawing Sheets

VENTILATED CHILD RESTRAINT SEAT

TECHNICAL FIELD

This invention relates in general to a child seat apparatus, and more particularly, relates to a child seat apparatus that includes a means for providing climate control to the area in and around the child seat. The climate control is provided by the climate control mechanism of the vehicle into which the child seat is disposed, and to which it is operatively connected.

BACKGROUND

A typical child seat apparatus, as is often employed in a vehicle such as an automobile, typically comprises a seat portion and a backrest portion extending from the rear part of the seat portion. Reinforced loops or other means are typically disposed on the surface of the backrest portion opposite the side upon which the child rests. These reinforced loops are formed, for example, of molded plastic into the back of the child seat apparatus, and provide a locking mechanism for securing the child seat in the vehicle. The automobile safety belts pass through these reinforced loops, securing the child seat apparatus into the vehicle. This prevents the child seat from moving about in the event of an automobile accident or other unexpected motions caused by, for example, acceleration, hard breaking or emergency maneuvering. The child is then placed in the seat, and is secured in by, for example, safety belts integrally formed in the child seat.

In addition to the seat portion and the backrest portion, the child restraint seat may further comprise first and second side guards defining a pair of side walls frontwardly extending from both side edges of the backrest portion respectively, and first and second arm rest portions defining a pair of arm rests outwardly extending from both inside edges of the seat portion. These side wall portions and arm rest portions improve the safety afforded to the child sitting therein. Further, these portions render the child seat apparatus marginally more comfortable for the child seat occupant.

In recent years considerable effort has been made to improve both safety and comfort of automobile child restraint seats. For example, U.S. Pat. No. 5,647,634 describes a new and improved child restraint seat. Similarly, U.S. Pat. No. 4,902,070 describes improvements in the child restraint seat shape and formation. These improvements typically relate to better seating position as between the backrest portion and the seat portion, and better formation of the integrally formed belts for the child restraint seat. Alternatively, much effort has been dedicated to improving the mechanisms by which the child restraint seat is locked into the automobile.

Conversely, minimal attention has been paid to the issue of child comfort in such seats. While most child restraint seats include cushions and padding in order to ease the seat occupants comfort (as typical child restraint seats are formed of manufactured plastic, injection molded to a particular shape) such seats are still in fact rather uncomfortable. This is attributable not only to the hardness of the child restraint seat, but also to environmental conditions in the area around which said seat is disposed.

Both adults and children are subject to discomfort from being seated in one position for long periods of time. Just as the back and backsides of adults become uncomfortable and hot from being seated for long periods of time in a car seat, so to do those of the children. However, adults have the advantage of being able to move about in the seat and, as adult safety belts do not restrain as completely as those found in child seats. This is due to the fact that adult safety belts manufactured into automobiles include all manner of pre-tensioning mechanisms that engage only when needed.

By contrast, child restraint seats do not include such devices, obliging the child to be urged snugly against the seat. Accordingly, children do not have the option of simply moving around in their seat to find better temperature comfort. Child restraint belts and child restraint seats often bind the child so tightly into the seat as to prevent them from having any movement at all. In order to reduce the effect of environmental conditions, after market products such as after market shades, and fans have been introduced in order to try and prevent overheating of children in child restraint seats. Unfortunately, no reliable after market product has to date been introduced which addresses the situation that arises in cold environments.

Accordingly, there exists a need for an improved child restraint seat for automobiles that allows for better temperature comfort for children seated therein. Such a feature of the child restraint seat must be able to take advantage of existing systems provided in the automobile, while not duly taxing the vehicle equipment, i.e., air conditioning and heating. Moreover, any such system may not compromise the primary function of the child restraint seat: Safety.

SUMMARY OF THE INVENTION

Briefly according to the invention, there is provided a ventilated child restraint seat for use in a motor vehicle. The purpose of the seat is to provide a more environmentally comfortable location for children in automobiles. The restraint seat includes a seat member having a seating surface defined by a bottom portion, a back portion and two side portions. At least the bottom and said back portions having a plurality of openings, such as, for example, holes or slots formed therethrough. In an alternative embodiment, the left and right side portions may likewise have openings formed therethrough. The seat member further has an air pocket or reservoir formed on the side of the bottom and back portions opposite said seating surface.

A connection member having first and second ends is used to connect the seat to a source of temperature conditioned air. The first end includes means for engaging or coupling to a heat/air conditioning vent in said motor vehicle. The second end may be coupled to a duct member, which itself has at least first and second ends. At least one end of the duct member is mountable to an opening in said air pocket, and at least the other of the ends is sized so as to accommodate the second end of the connection member. Of course, the second end of the connection member and the opening in the air pocket may be similarly sized so that the two ends of the duct member are substantially the same size and shape.

By connecting the child restraint seat to the motor vehicle heating/air conditioning vent via the air pocket, duct member and connection means, temperature conditioned air from said motor vehicle heat/air conditioning vent is directed through said connection member, duct member and air pocket to said seating surface.

DETAILED DESCRIPTION OF THE PREFERRED EMBODIMENT

Figure 1:
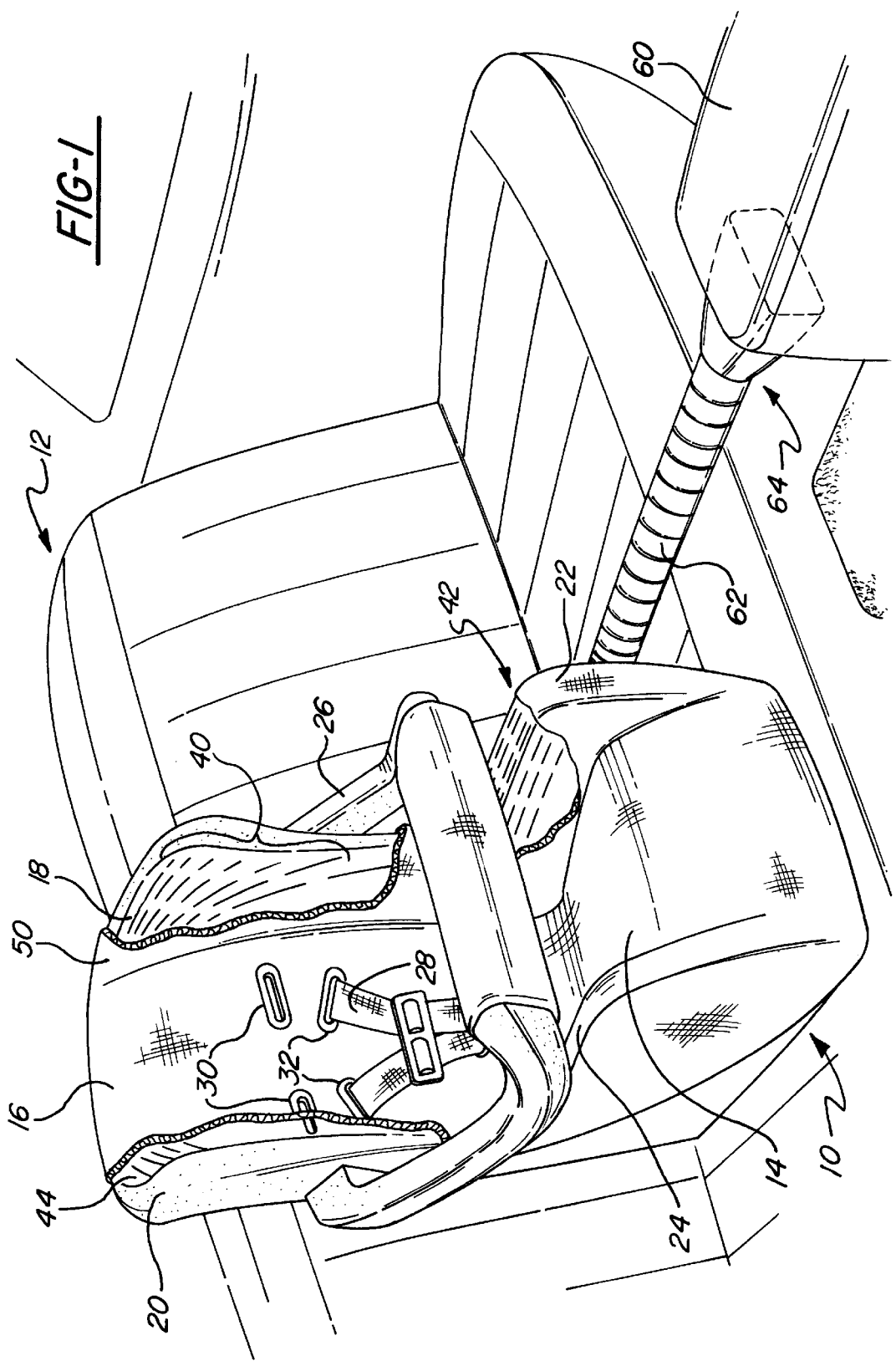
FIG. 1 is a partial cutaway representation of a ventilated child restraint seat, in accordance with the instant invention.

While the specification concludes with claims defining the features of the invention that are regarded as novel, it is believed that the invention will be better understood from consideration of the following description in conjunction with the drawing figures, in which like reference numerals are carried forward.

A ventilated restraint seat for use in, for example, an automobile, includes a molded plastic seat member into which is formed a seat bottom, a seat back, and left and right side portions. It is to be noted that while the instant invention describes the ventilated restraint seat primarily for use with children, it is not so limited. The problem of temperature discomfort associated with child seats is also experienced in some adults, particularly those for whom motion is limited, such as the physically handicapped.

The ventilated seat includes a molded seat member sized and shaped so as to fit in a conformal fashion with conventional automobile bench and bucket seats. Formed through and in the bottom, back and left and right side portions are a plurality of openings or vents through which fresh air may flow. The openings may be, for example, a series of holes or slots formed through the molded plastic seat. Disposed behind the bottom and back portions for the seat member, on the side thereof closest to the automobile seat, is an air reservoir or pocket into which fresh air flows. Air in these reservoirs flows through the openings and into the seat.

The ventilated child restraint seat may be connected to the ventilation system of the automobile into which it is disposed, via a flexible duct. The duct may have first and second ends. The first end of the duct is sized and shaped so as to fit into the ventilated child restraint seat. The second end of the duct is sized and shaped so as attachably accommodate one of a plurality of connection members. The connection members may be interchangeably affixed to the end of the flexible duct member, which are then used for connecting the duct to the ventilation system of the automobile. Most automobiles have a plurality of positionable vents disposed in the dashboard, and in larger vehicles, in the rear passenger compartment. As the vents in each automobile are different, the connection member must be able to accommodate many different connection members, each connection member corresponding to one or more automobile makes and/or models.

Referring now to FIG. 1, there is illustrated therein is a partial cutaway representation of a ventilated child restraint seat 10, in accordance with the instant invention. As may be appreciated from a perusal of FIG. 1, the seat 10 is located in, for example, the rear seat area 12 of a conventional automobile. The child restraint seat 10 is removably fastened into the rear seat area 12 by means of a seat belt (not show) engaging reinforced metal or plastic loops (also not shown) in the rear of the seat 10. The seat 10 is formed with a bottom seat portion 14, a seat back portion 16, left and right wing extensions 18 and 20 respectively, and left and right arm rests 22 and 24 respectively. The seat 10 may also include a moveable restraining arm 26 which rotates from the closed position as illustrated, into an overhead position so as to facilitate easy access to the seat. The seat 10 may also include restraining belts for holding the child occupant securely in the seat. The seat may also include one or more sets of passages in the seat back portion through which the restraining belts are passed, and anchored into the rear of the seat. These sets of passages 30 and 32 are provided to size the length of the restraining belts to a size roughly equivalent to the size of the child to be restrained.

The seat 10 is typically formed of a soft, durable, fire proof, molded plastic material such as polycarbonate and ABS plastic to name a few. Formed through the seat bottom, seat back, wing extensions and arm rests are a plurality of holes, slots or vias to allow for the passage of air, in a manner explained in greater detail hereinbelow. For example, left wing extension 18 has a plurality of slots 40 formed there through and into an air reservoir, as described in greater detail hereinbelow. Similarly, left armrest 22 has a plurality of slots 42 formed therein, and backrest portion 16 has slots 44 formed therein. Restraining arm 26 may likewise have holes, slots or vias formed therein, but as such slots are typically directed towards the seat occupant, they would not be visible in the representation of FIG.1.

The restraint seat has formed or disposed thereover a cushioned, washable fabric covering 50. The cushioned nature is required to assure the comfort of the seat occupant, while the washable nature is desirable when accommodating the needs of young travelers. As the seat of the instant invention is also intended to allow the passage of fresh air to the seat occupant in a fashion described below, it will be appreciated that the fabric covering 50 should be sufficiently air permeable so as to allow for the continuous flow of air out from slots 40, 42 and 44. Accordingly, the fabric covering is preferably fabricated of for example, Gortex or nylon. Other materials will suggest themselves to one of ordinary skill in the art, who would appreciate that such materials need, at a minimum, to be durable, washable, and fireproof. The thickness of the fabric covering will vary with the choice of material.

The seat 10 is coupled to the ventilation system 60 of the automobile by means of a hose or conduit 62 and a fitting 64. In particular, and referring now to FIG. 3, the fitting 64 has first and second ends 66 and 68. The first end 66 is sized and shaped so as to accommodate the hose for coupling the ventilation system to the seat. Accordingly, an opening in first end 66 allows the passage of and engagement by the hose 62. The hose and fitting engage by any of a number of means known in the art, examples of which include snaps, a "ball-in-hole," snap ridges, and friction engagement to name but a few. Also, the fitting and or the hose may include a vent 67 formed through one side thereof. This allows a vent flap 69 (shown below in FIG. 2) to redirect air from the automobile air conditioning system into the passenger compartment, rather than into the child restraint seat. This vent and flap could alternatively be positioned in conduit 62.

The second end 68 likewise includes an opening 70 adapted to allow the passage of air from the ventilation system 60 to the hose 62, and ultimately the seat 10. The opening 70 is preferably sized and shaped to approximate the size and shape of the vent in the automobile ventilation system. It may therefore be appreciated that it is within the spirit and scope of the instant invention that the seat 10 may in fact be equipped with a plurality of different fitting, each adapted to engage a different make of automobileis ventilation system. For example, many late model Chrysler products have ventilation system vent openings which are substantially rectangular in shape, and size approximately 1 inch by three inches. Accordingly a first fitting 64 would be likewise sized and shaped. Similarly, many late model General Motors products have ventilation system vent openings which are circular, and accordingly the fitting 64 could be sized and shaped to accommodate such a vent. It may be easily appreciated that the child restraint seat may therefore be easily retrofittable for any subsequent make or model of automobile. It is also to be understood that while the instant invention acknowledges the problems associated with vent openings of differing sizes and shapes, the invention is not limited to any particular size or shape of fitting.

Disposed inside opening 70 of end 68 are engagement means 72 and 74. As illustrated the engagement means 72 and 74 are each elongated hook shaped members adapted to engage the inside of the ventilation system vent openings. The hook shaped members may be actuated by depressing, for example, depressing buttons 76 and 78 on members 72 and 74 respectively. The buttons may extend through holes formed in the fitting 64.

Alternatively, the engagement means may be fitted as strips of velcro bonded to the periphery of the second end 68 of the fitting 64. In this embodiment, either the male or female velcro strip may bonded to the fitting, while the other strip is bonded to the exterior of the ventilation system vent opening. Other means of attaching the fitting to the ventilation system vent opening will suggest themselves to one of ordinary skill in the art.

Figure 2:
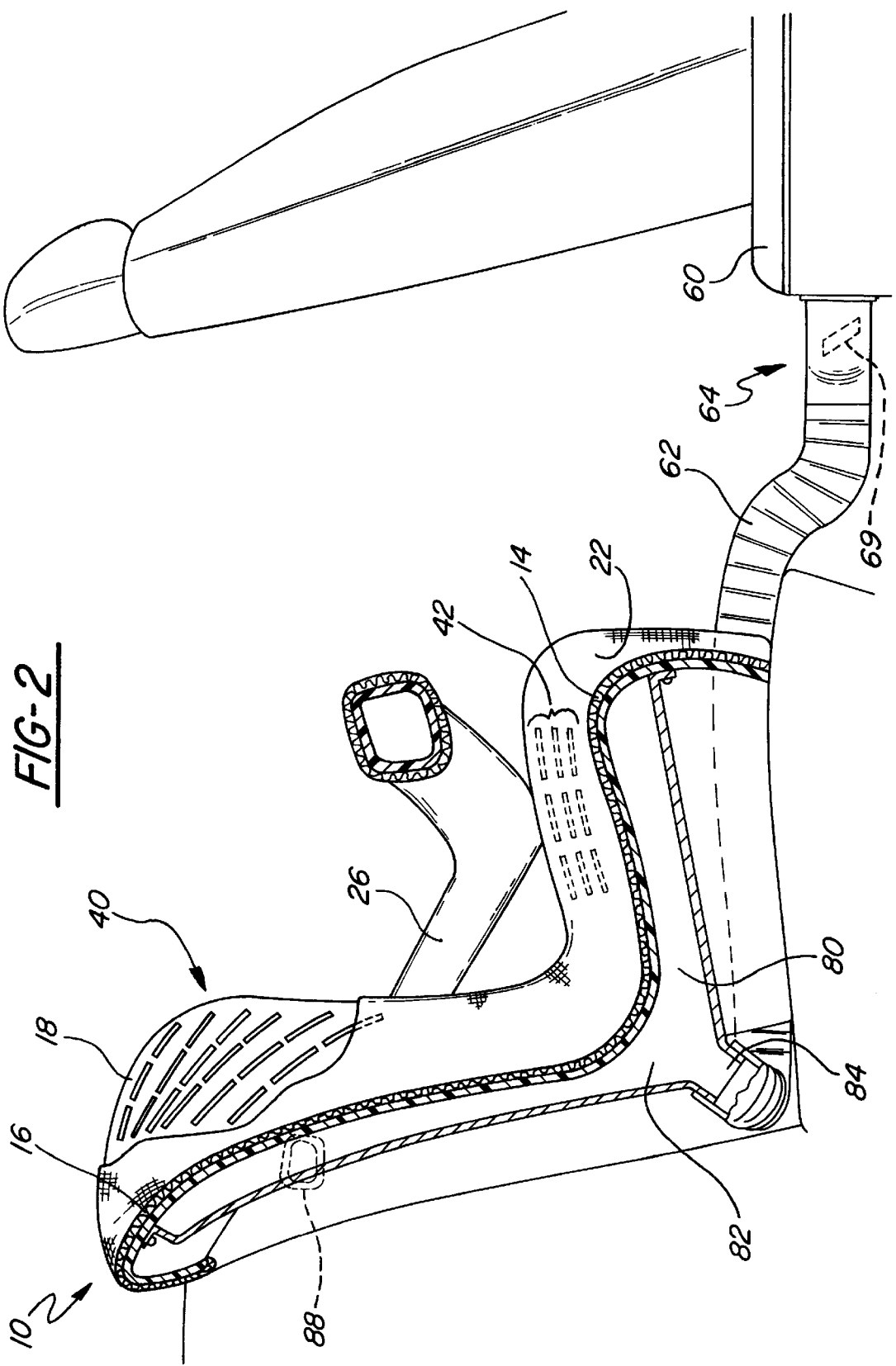
FIG. 2 is a cross-sectional side view representation of the seat member, so as to show the relationship of the vent openings and air pocket, in relation to a ventilated restraint seat, all in accordance with the instant invention.
Figure 3:
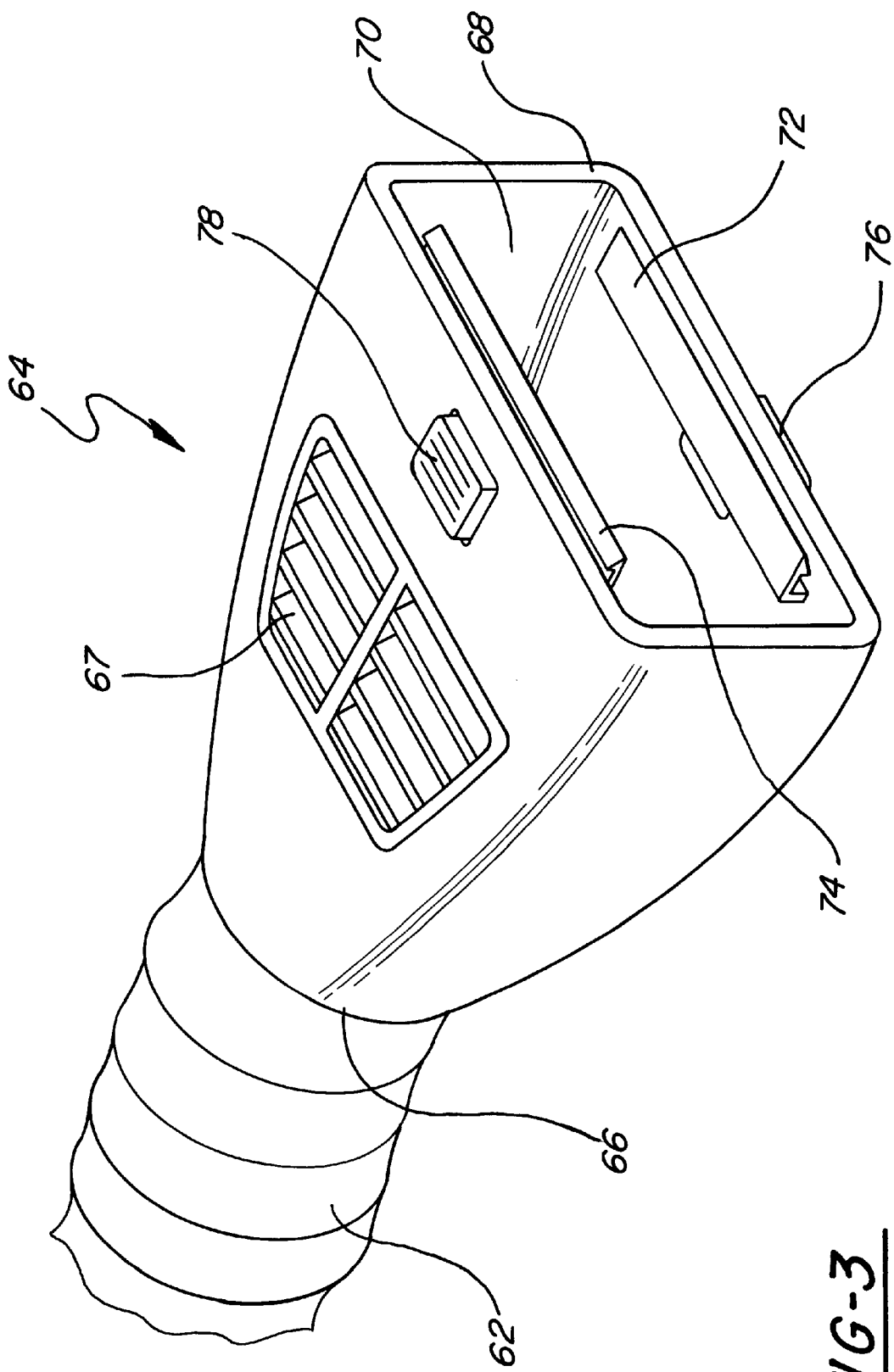
FIG. 3 is a representation of the connection member used with a ventilated child restraint seat, in accordance with the instant invention.

Referring now to FIG. 2, there is illustrated therein a cross-sectional side view representation of the seat member, so as to show the relationship of the vent openings and air pocket In particular, the seat 10 is formed as described above, and with an air reservoir 80 formed behind and beneath the seating area defined by the seating surface 14, back seat rest 16 and the left and right wing extensions and arm rests. It may be appreciated from a perusal of FIG. 2 that the vent openings 40, 42, and 44 are all through the formed seat, and lead directly into the interior of the reservoir 80.

Fresh air from the ventilation system 60 flows through the fitting 64 and the hose 62 into the base 82 of the reservoir. The base of the reservoir is equipped with a fitting 84 adapted to engage the second end of the hose 62 in a fashion such as that described above with respect to the engagement of the hose by fitting 64. It may thus be appreciated that warm or cool air provided by the ventilation system 60 passes through to the air reservoir 80, and out the vent slots 40, 42 and 44 connected thereto, and into the seating area occupied by the child strapped into the child restraint seat. FIG. 2 also illustrates the vent flap 69 described above with respect to FIG. 3. In particular, it is to be appreciated that the vent flap 69 and vent opening 67 serve as an air volume control on the amount of air flowing to the child restraint seat.

It may also be appreciated that arm member 26 may be equipped with an opening 88 so as to allow to flow through the reservoir, into the arm opening and out of vents (not shown). This has the beneficial effect of directing air into the face region of an occupant of the seat.

It is to be noted that while the instant invention has been described primarily for use with infants and small children, it is not so limited. As noted above, many adults, particularly those who are physically handicapped, often require a car seat that fastens them securely into an automobile. In such a situation, an adult version of the ventilated seat will serve to eliminate the types of discomfort described hereinabove.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A ventilated child restraint seat adapted to be removably attached to a motor vehicle seat, comprising:

a seat member having a seating surface defined by a bottom portion, a back portion having left and right wing extensions, two side portions, and restraining belts secured to the seat member for holding a child occupant securely in the child restraint seat, at least said bottom and said back portions having a plurality of openings formed therethrough, said seat member further having an air pocket formed on a side of the bottom and back portions opposite said seating surface;

a moveable restraining arm pivotally attached to said left and right wing extensions of said seat back portion which rotates from a closed position in front of said seat back portion to an overhead position above said seat back portion;

a connection member having first and second ends, the first end including engagement means for coupling to a heat/air conditioning vent in said motor vehicle; and a duct member having at least first and second ends, at least one of said ends being mountable to an opening in said air pocket, and at least one of said ends being sized so as to accommodate the second end of said connection member;

whereby temperature conditioned air from said motor vehicle heat/air conditioning vent is directed through said connection member, duct member and air pocket to said seating surface.

2. A ventilated child restraint seat as in claim 1, wherein said seat member further includes means for anchoring said seat into said motor vehicle.

3. A ventilated child restraint seat as in claim 1, wherein said seat member further includes openings in said left and right side portions.

4. A ventilated child restraint seat as in claim 1, wherein said seating surface is covered in an air permeable padding allowing said temperature conditioned air to pass through said padding and into said seating surface.

5. A ventilated child restraint seat as in claim 1, wherein said engagement means comprise a plurality of spring loaded hooks sized and shaped to fit into and engage the interior portion of said heat/air conditioning vent.

6. A ventilated child restraint seat as in claim 1, wherein said engagement means further comprises a sealing ring disposed around the periphery thereof for preventing air leakage.

7. A ventilated child restraint seat as in claim 1, wherein said connection member is removably affixed to said duct member so as to individually accommodate a plurality of connection members.

8. A ventilated child restraint seat as in claim 1, wherein said plurality of connection members each have a different first end, each different first end sized and shaped to engage a different heat/air conditioning vent.

9. A ventilated child restraint seat as in claim 1, wherein said first end of said connection member is sized so as to fit completely over said heat/air conditioning vent.

10. A ventilated child restraint seat as in claim 1, wherein said duct member has at least three ends, one end coupled to said connection member, and second and third ends coupled to the air pockets of first and second ventilated child restraint seats.

\* \* \* \* \*